United States Patent
Lovegrove et al.

(10) Patent No.: US 9,164,205 B2
(45) Date of Patent: Oct. 20, 2015

(54) SOLAR MIRROR PANELS AND THEIR MANUFACTURE

(76) Inventors: Keith Malcolm Lovegrove, Fisher (AU);
Gregory John Burgess, Kaleen (AU);
Joseph Sydney Coventry, Watson (AU)

( * ) Notice: Subject to any disclaimer, the term of this patent is extended or adjusted under 35 U.S.C. 154(b) by 612 days.

(21) Appl. No.: 13/263,085

(22) PCT Filed: Apr. 6, 2010

(86) PCT No.: PCT/AU2010/000390
§ 371 (c)(1),
(2), (4) Date: Apr. 20, 2012

(87) PCT Pub. No.: WO2010/115237
PCT Pub. Date: Oct. 14, 2010

(65) Prior Publication Data
US 2013/0141808 A1    Jun. 6, 2013

(30) Foreign Application Priority Data
Apr. 6, 2009    (AU) ................ 2009901467

(51) Int. Cl.
| | |
|---|---|
| G02B 5/08 | (2006.01) |
| B29D 11/00 | (2006.01) |
| F24J 2/10 | (2006.01) |
| G02B 5/10 | (2006.01) |
| G02B 7/183 | (2006.01) |

(52) U.S. Cl.
CPC ............ *G02B 5/08* (2013.01); *B29D 11/00596* (2013.01); *F24J 2/1052* (2013.01); *F24J 2/1057* (2013.01); *G02B 5/10* (2013.01); *G02B 7/183* (2013.01); *Y02E 10/40* (2013.01)

(58) Field of Classification Search
None
See application file for complete search history.

(56) References Cited

U.S. PATENT DOCUMENTS

| | | | | |
|---|---|---|---|---|
| 4,310,747 | A * | 1/1982 | Rice et al. | 392/466 |
| 6,206,531 | B1 * | 3/2001 | Williams et al. | 359/883 |
| 7,077,532 | B1 * | 7/2006 | Diver et al. | 359/871 |
| 7,550,054 | B2 | 6/2009 | Lasich | |
| 2002/0185124 | A1 * | 12/2002 | Blackmon et al. | 126/680 |

OTHER PUBLICATIONS

Diver, RB & Grossman, JW. Sandwich Construction Solar Structural Facets, 1998. SAND98-2845C.

* cited by examiner

*Primary Examiner* — Jennifer L. Doak
(74) *Attorney, Agent, or Firm* — Galbreath Law Offices, P.C.; John A. Galbreath (57) ABSTRACT

A solar mirror panel (10) has a first sheet-like stiffening member (12) having a reflective surface, a second sheet-like stiffening member (18), and a spacer member (16) of resin bonded wood composite located between the first and second members (12, 16).

50 Claims, 5 Drawing Sheets

SOLAR MIRROR PANELS AND THEIR MANUFACTURE

FIELD OF INVENTION

This invention relates to improvements in solar mirror panels and their manufacture.

BACKGROUND

Sunlight is a source of "renewable" energy that may be captured for human use using various techniques. One method of concentrating light is to use reflective (mirrored) optics. Mirrors are moved to track the sun with either single or dual axes of movement, focussing light to a receiver where some sort of energy collection or conversion process is carried out.

When dishes are used the mirrored surface preferably follows a desired surface to a relatively high degree of accuracy so that the focal area is relatively small and the efficiency high.

Typically the mirrored surface is made up of a large number of individual mirrored panels but may be a single panel.

A solar thermal power plant may require hundreds or thousands of individual mirror panels. Accordingly, the cost of each panel has a significant influence on the overall cost of the solar thermal power plant.

SUMMARY OF THE INVENTION

The invention provides novel solar mirror panels, moulds for manufacture of the panels, methods for the manufacture of the moulds and methods and techniques for the manufacture of panels.

Panel

In one broad form the invention provides a solar mirror panel sandwich panel comprising:
- a sheet-like reflective member having a reflective surface;
- a first sheet-like stiffening member, and
- a spacer member of resin bonded wood composite located between the reflective and stiffening members.

The panels preferably have an average slope error of less than or equal to about 5 milliradian, more preferably less than about or equal to 2 milliradian and most preferably less than or equal to about 1 milliradian.

Using the systems and techniques of the invention we can obtain panels with a relatively high accuracy and, accordingly, in one broad form the invention also provides a solar mirror panel comprising:
- a sheet-like reflective member having a reflective surface;
- a first sheet-like stiffening member,
- a spacer member located between the reflective and stiffening members,
- wherein said reflective surface has an average slope error of less than or equal to about 5 milliradian.

Resin bonded wood composite or other materials may be used for the spacer member, such as, but not limited to: paper or aluminium honeycomb; expanded (foamed) polymers or plastics, such as expanded Polystyrene, PVC, Polyurethane, Polypropylene, Polymethyl methacrylamide (acrylic) and Styrene acrylonitrile (SAN); Balsa wood; Bamboo or cardboard.

Preferably the average slope error is less than or equal to about 2 milliradian and preferably less than or equal to about 1 milliradian.

The panels according to the statements above may have a second stiffening member located between the reflective member and the spacer member.

The panels according to the statements above may be of any type, including parabolic type mirrors and trough type mirrors.

The resin bonded wood composite may be a fibre board type material, plywood, a chip board or a particle board material. Preferably the resin bonded wood composite is medium density fibreboard.

The reflective member is preferably at least self supporting but need not be.

The reflective member may comprise a single layer that is reflective and which is or is not self supporting or two or more discrete layers—a reflective layer and one or more layers that do or do not provide stiffness.

The reflective member is preferably formed of a thin sheet of glass with a reflective coating, such as a thin layer of silver, on its rear surface, together with one or more layers of protective paint or other material. Other materials such as polished aluminium or reflective polymers may be used. The preferred thickness of the glass is less than about 2.0 mm, more preferably less than about 1.5 mm and most preferably about 1.0 mm.

The stiffening members may be the same or different materials. The thickness of these two members may be the same or different.

The stiffening member or members are preferably thin sheets of metal, more preferably steel sheets. The preferred thickness of the steel is between about 0.3 and 1.0 mm and more preferably about 0.4 mm.

The members are preferably bonded to each other using adhesive and more preferably hot melt adhesive.

Mould

The invention also provides a mould for the manufacture of a multi layer solar mirror panel comprising at least two layers of material bonded together, the mould comprising:
- a first set of structural members;
- a second set of structural members, and
- a panel having a front, mould defining, surface and a rear surface, wherein:
- said first set of structural members are arranged generally parallel to each other side by side and each having a first top surface, and
- said second set of structural members are arranged generally parallel to each other side by side and generally perpendicular to the first set of structural members and each having a second top surface,
- the rear surface of said panel being attached to the first and second surfaces so as to follow a desired mould surface.

The first set of structural members preferably each have a first base and plurality of first slots extending from the first top surface toward said first base and the second set of structural members each have a second base and plurality of corresponding slots extending from the second base toward the second top, whereby the first and second sets engage each other.

The mould is not limited to use in manufacture of the panels according to the invention or the method of manufacture of the panels of the invention.

Manufacture of Mould

The mould may be manufactured by:
- providing a plurality of first elongate planar structural members and a plurality of second elongate planar structural members,
- engaging each first member with said plurality of second members and each second member with said plurality of first members in perpendicular engagement so the members of each set are generally parallel and spaced apart side by side relative to the others of the same set, and connecting one or more sheets of mould surface defining material to the engaged first and second members to define a mould surface.

The step of providing the first and second members may include providing at least one sheet or panel of material and cutting said first and second members from the at least one sheet;

Manufacture of the Panels.

The manufacture of panels utilises a process that generates a temperature gradient through the various members of the panel as the members of panel are being adhered to each other.

The invention provides a method of manufacturing a solar mirror sandwich panel, the method comprising:

providing, stacked one on top of another, a stack of at least:
  a sheet-like reflective member having a reflective surface;
  a first sheet-like stiffening member,
  a spacer member located between the reflective and stiffening members,
with layers of adhesive material between adjacent members;
conforming the at least three members to an initial shape, and
whilst maintaining the at least three members conformed to the initial shape:
  (a) cooling, heating and/or both heating and cooling the members so as to create one or more controlled temperature gradients:
  between the members,
  within one or more members, or
  between the members and within one or more members,
and, whilst the one or more controlled temperature gradients exist,
  (b) bonding adjacent members together with the adhesive therebetween.

The term "stack" is to be interpreted as not placing any limitation as to orientation of the members or their order relative to the horizontal. In particular it does not require the members to be arranged generally horizontally or with one particular member above another. The stack may be arranged with the sheet like members extending generally vertical or at any other angle. When the members extend generally horizontal the reflective layer may be above or below the spacer member.

By varying the temperature gradient through (or across) the panel, each member (or part of a member) will be at a different temperature when the adhesive sets. As such the amount that each member of a panel contracts when cooled to ambient differs. By adjusting the temperature gradient through the panel at the time(s) of setting the relative contraction of members and hence final curvature of a panel can be controlled so that consistent desired shapes can be obtained.

In a preferred form the adhesive layers are of thermoplastic (hot melt) adhesive and bonding of adjacent members is achieved by first heating the members and adhesive to above the respective melting temperature of the adhesive and then cooling the respective adhesive layer to below the setting temperature of the adhesive.

Each hot melt adhesive layer may be attached or bonded to one or both members either side of the adhesive before being heated to above the respective melting temperature.

In a preferred form a layer of hot melt adhesive is bonded to at least one member, preferably a stiffening layer, before assembly of the stack. After assembly the hot melt adhesive is heated, melting the hot melt adhesive.

A panel may be assembled with two or more members bonded to each other by hot melt adhesive in an initial state, heated to melt the hot melt adhesive and then steps a) and b) carried out. The initial state may be a generally flat state but may be a curved state.

Adhesives other than hot melt adhesives may be used. Thermosetting adhesives that are set irreversibly by heat, irradiation or as a result of a chemical reaction, such as two part or catalytically set adhesives, may also be used. Examples include epoxy resin and polyurethane. Typically such thermosetting adhesives cure depending on both time and temperature.

Adhesives that set generally independent of temperature or that can be caused to set almost instantly may also be used. Examples include adhesives that are set by application of radiation. Where such adhesives are used then it is purely the temperature gradient that provides adjustment of curvature. Assuming the same adhesive were used between members then the adhesive layers can be set at substantially the same time.

In a preferred form the temperature of the members is reduced whilst maintaining the one or more temperature gradients. The one or more temperature gradients may change with time In one form layers of hot melt adhesive are cooled to below the respective setting temperature sequentially from one side (the top or bottom) of the stack. However, the stack may be cooled from both sides (both the top and bottom) so that layer(s) toward the centre of the stack cool to their setting temperature after layers above and below have cooled to their setting temperature.

Preferably the same hot melt adhesive is used between adjacent members but two or more different hot melt adhesives may be used.

In a preferred form all of the adhesive layers are of the same hot melt adhesive.

The panel preferably has four members and three layers of hot melt adhesive.

The temperature(s) of the layer(s) of hot melt adhesive (whether bonding adjacent layers or not) at the time another layer of hot melt adhesive cools to its setting temperature may be varied to compensate for variations in moulds and/or so as to create panels that at the same temperature have different curvatures.

DETAILED DESCRIPTION OF PREFERRED AND OTHER EMBODIMENTS

Panel

Figure 1:
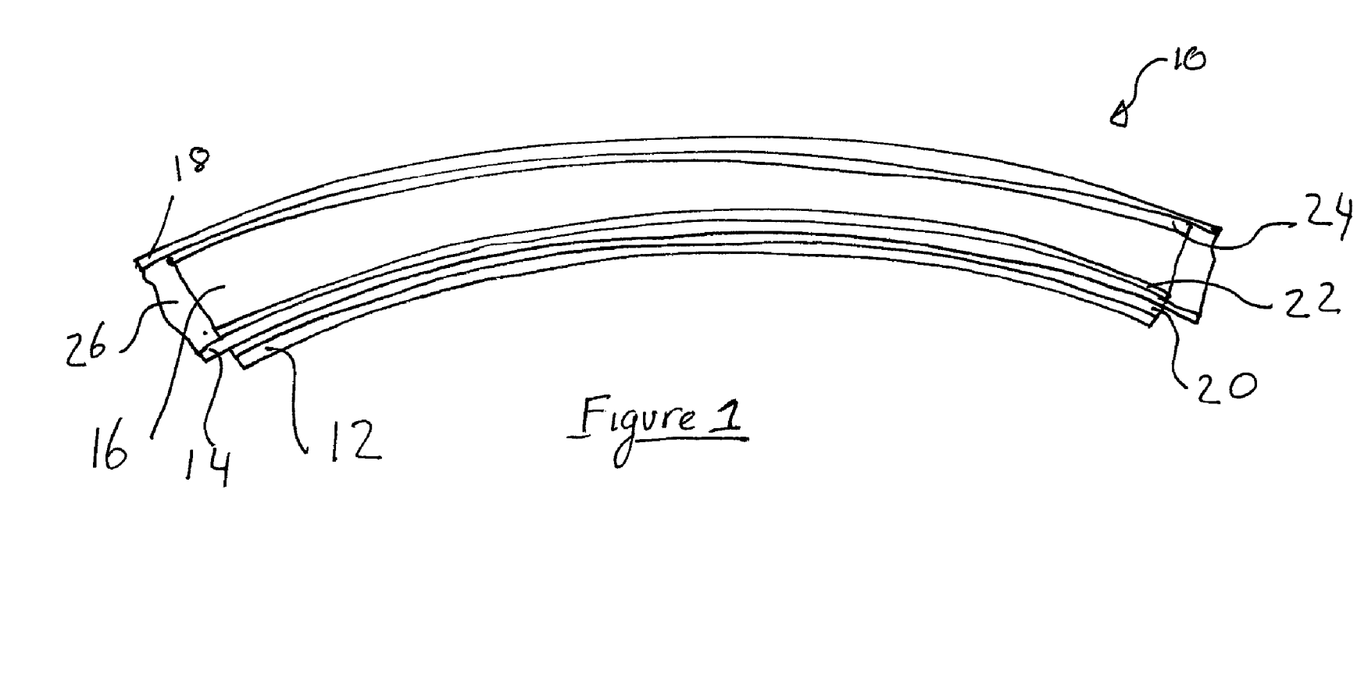
FIG. 1 is a cross section through a reflective panel made according to one embodiment of the invention.

Referring to the drawings there is shown a solar mirror panel 10. The panel is comprised of a reflective member 12, two stiffening members, 14, 18 and a spacer member 16. The spacer member 16 is sandwiched between the two stiffening members 14, 18 and one of the stiffening members 14 is sandwiched between the spacer member 16 and the reflective member 12. Three layers of adhesive 20, 22 and 24, preferably hot melt adhesive, are located between adjacent members and secure the members together. The setting temperature(s) of the hot melt adhesive layers 20, 22 and 24 is above the anticipated temperatures the panel may be exposed to during transport, manufacture and use. A setting temperature of greater than about 75 centigrade is preferred.

The spacer member 16 serves to separate the two stiffening members and increase the stiffness of the panel compared to a panel having the same amount of stiffening material in a single layer.

The two stiffening members 14, 18 are preferably slightly larger than the spacer member 16 but may be the same size. A sealant 26 is located on the edges of the spacer member 16 between the two stiffening members 14, 18. The reflective member 12 is also smaller than the stiffening members. This is mainly to limit or prevent damage to the reflective member during manufacture, transport and assembly. The panels may be stored or transported vertically and by making the reflective member smaller, loads are only transferred to the stiffening members 14, 18. If desired the reflective member may be as large as the stiffening members 14, 18. Similarly, if a sealant is not required the spacer member may be the same size as the stiffening members.

The stiffening members 14, 18 are preferably a metal and more preferably steel. Steel sheets having a thickness between about 0.3 mm and about 1.0 mm are preferred. In the preferred embodiment two metal layers are formed of the same steel and have the same thickness of about 0.4 mm. The two stiffening members may be formed of different materials and/or different thicknesses. Fibre reinforced resin, polymer or plastics sheets such as glass or carbon fibre may be used as stiffening members.

The spacer member 16 is preferably formed of a resin bonded wood composite. In the preferred embodiment the member 16 is formed of fibreboard and preferably medium density fibreboard (MDF) having a thickness of about 6 mm, a density between about 600 kg/m$^3$ and 900 kg/m$^3$. When such medium density fibreboard is used it preferably has a thickness between about 4.5 mm and about 9 mm. Other materials may be used but resin bonded wood composite provides consistency in properties and the ability to withstand temperatures above 100° C. without degradation together with low cost.

The resin bonded wood composite may be a fibre board type material, plywood, a chip board or a particle board material. Preferably the resin bonded wood composite is medium density fibreboard.

Other materials may be used for the spacer member, such as paper or aluminium honeycomb; expanded (foamed) polymers or plastics, such as expanded polystyrene, PVC, Polyurethane, Polyurethane, Polypropylene, Polymethyl methacrylamide (acrylic) and Styrene acrylonitrile (SAN); Balsa wood; Bamboo or cardboard.

The reflective member 12 in the preferred embodiment is a thin sheet of glass with a reflective coating (and protective paint or similar) on its rear (unexposed) surface, which is bonded by hot melt adhesive layer 20 to the metal member 14. The thickness of the glass is preferably less than about 1.5 mm and more preferably about 1.0 mm. Other materials may be used as a reflective surface, such as polished aluminium or polymer films, either alone or on a substrate. However, glass is preferred as it has superior scratch resistance than aluminium and polymer films.

Although the reflective member is formed of glass, when the panel has been assembled it is relatively resistant to impacts. The bonding to metal member 14 reinforces this thin layer of glass and limits damage from hail and the like to relatively small areas. The glass on metal lamination technique prevents or limits crack propagation and prevents the entire sheet of glass shattering from a single impact. Whilst the damaged area depends on the nature of the impact these are typically no larger than a 10 mm circle.

Using the structure described above and the manufacturing techniques of the invention, described below, the panels may be manufactured with an average slope error of less than or equal to about 5 milliradian, more preferably less than or equal to 2 milliradian and most preferably less than or equal to about 1 milliradian. The slope error at a particular point is the angle between the actual perpendicular to the surface at that point and the intended perpendicular at that point.

Mould

Figure 2:
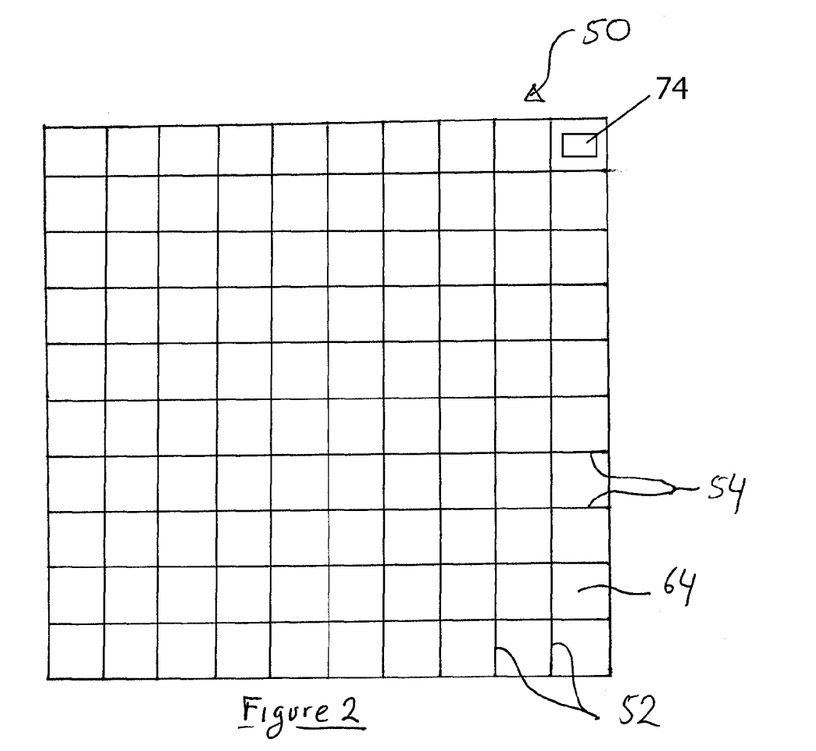
FIG. 2 is a plan view from below of a mould for making the pane of FIG. 1.
Figure 3:
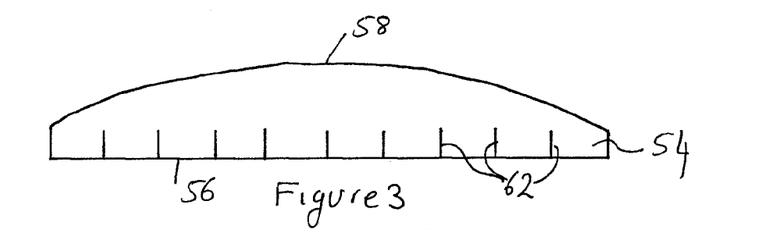
FIG. 3 is a side view of a first component of the mould of FIG. 2.
Figure 4:
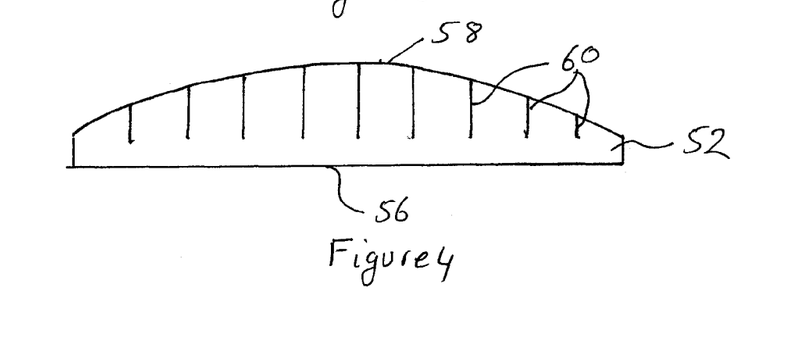
FIG. 4 is a side view of a second component of the mould of FIG. 2.

Referring to FIGS. 2 to 4 there is shown a mould 50 for manufacture of the panel of FIGS. 1.

The mould 50 comprises a first set of structural members 52 and a second set of structural members 54. The members of the first set are arranged generally parallel to each other side by side. The members of the second set are arranged generally parallel to each other side by side and extend generally perpendicularly across the first set.

The structural members are formed from sheet metal and, as seen in FIGS. 3 and 4, each has a straight base 56 and a convex curved top edge 58. The structural members may be cut from sheets of metal using an automatic cutting machine, such as a computer controlled laser cutter. Using such a cutter the top edges 58 may be cut accurately.

The first set of members 52 is formed with slots 60 extending from the top edge 58 toward the base 56 whilst the second set 54 is formed with corresponding slots 62 extending from the base 56 toward the top edge 58. The two sets 52, 54 can thus be assembled by simply placing the first set 52 on a planar surface and sliding each of the second set 54 downwards.

The top edges 58 thus follow a desired surface. This surface may be part of a sphere or may be part of a paraboloid of revolution, a surface that is commonly referred to as being a parabolic surface, or any other shape. If a parabolic surface is desired it is relatively easy to cut the members 52, 54 appropriately, as the top edge 58 of each member will be part of a parabola.

Mounted on the top edges 58 of the first and second members 25, 54 is a layer 64 that forms the actual mould surface 66. The layer 64 is preferably a steel sheet with a non stick coating on its upper side. The steel sheet 64 is secured to the top edges 58 using a combination of tack welding and silicon sealant/glue and so accurately follows the surface defined by the top edges 58. Other ways of securing the layer to the top edges may be used. The curving of the steel sheet is in the elastic range.

The mould surface 66 is thus a convex surface. The mould may be manufactured so that the mould surface is concave. This may be achieved by cutting the structural members 52, 54 so the top edges 58 are concave rather than convex.

Manufacture

Figure 5:
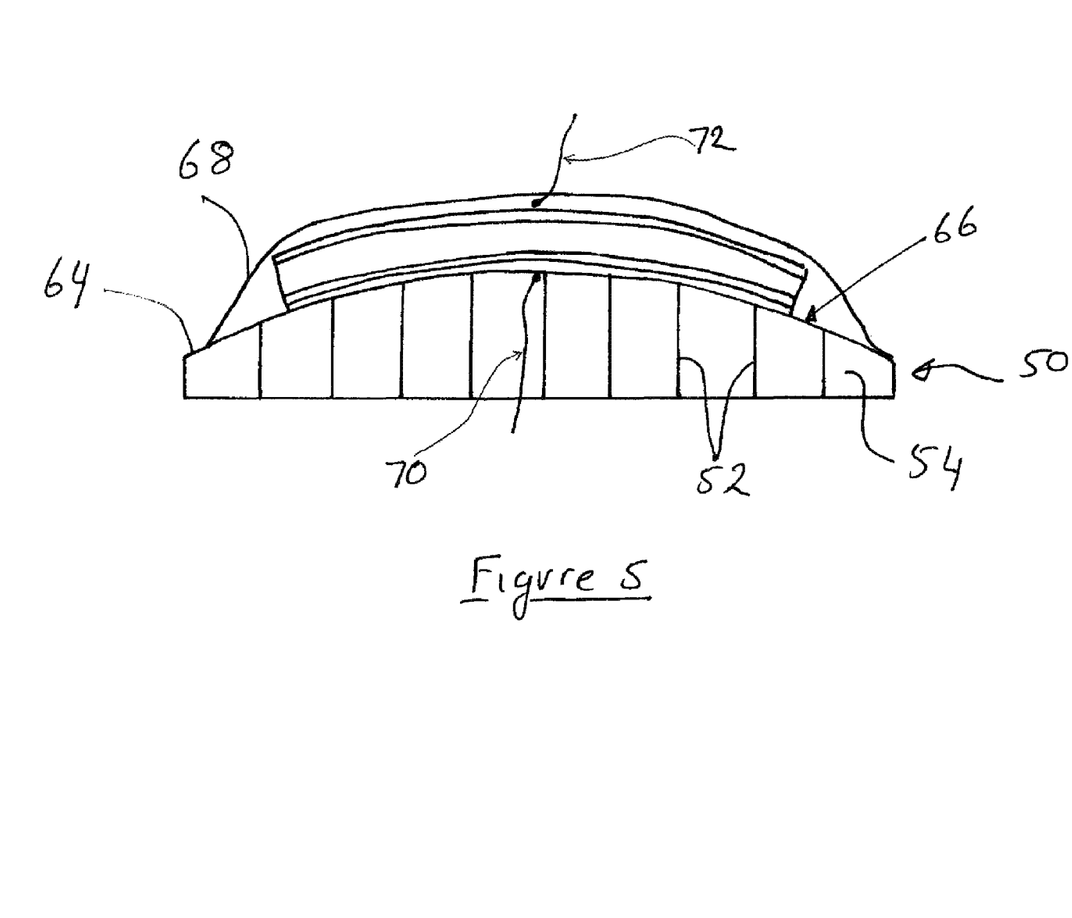
FIG. 5 is a cross sectional view through the mould of FIG. 2 during manufacture of a reflective panel.

Referring to FIG. 5, the mould 50 is used to vacuum form the panels 10 and, in the preferred method, is positioned horizontally with the mould surface 66 uppermost. Other moulds may be used. The members of the panel 10 are placed sequentially on the mould to form a stack, starting with the glass member 12, followed by a first sheet 20 of hot melt adhesive, then the first member 14 of metal, a second sheet 22 of hot melt adhesive, the member 16 of resin bonded wood composite, a third sheet 24 of hot melt adhesive and finally the second member 18 of metal. The mould has locating devices, not shown, to ensure the edges of the various members are all substantially aligned with each other. In practice the layers of hot melt adhesive may be oversized to ensure there is adhesive over all of the surfaces to be bonded.

If a mould with a concave mould surface is used the components will be reversed and placed on the mould in reverse order, with the metal member 18 lowermost and the glass member 12 uppermost. The surface of the glass is thus exposed, with the reflective layer of metal on its lower surface.

Whilst use of sheets of hot melt adhesive is preferred it is within the scope of the invention to apply the hot melt adhesive by other means, such as by spraying liquid or solid particles of hot melt adhesive onto the exposed surface of each member. This may be before or after placement on the stack. It is to be understood that the term "hot melt adhesive" means any thermoplastic adhesive that melts or becomes soft above a certain temperature and the term does have any limitations as to application of the adhesive.

In the currently preferred method adhesive is applied to one or both the metal sheets 14 and 18 before assembly and each metal/adhesive laminate is placed on the stack as a single unit.

At this stage the members are generally supported at their centre and merely droop downwards under the action of gravity and do not necessarily follow the shape of the mould surface. In a similar manner, if a concave mould is used the members will be supported at their edges and the centre will droop downwards toward the mould under the action of gravity.

A vacuum bag is then placed over the assembly and a vacuum applied, forcing the members to conform to the mould surface 66. Other means of conforming the members to the mould surface may be used. As an example a fluid at high pressure may be applied (directly or indirectly) to the exposed surface of the upper member to push the layers toward conformity with the mould surface. A platen with a shape complementary to the mould shape may be used. Methods of conforming layers to a concave or convex mould surface are well known and the specific technique used is not critical to the invention.

Whilst the vacuum is applied the entire assembly is heated to above the setting point of the hot melt adhesive layers 20, 22, 24. In the preferred technique the entire mould and assembly is placed in an industrial oven maintained at about 130° C. The actual temperature is not critical so long as it is above the setting temperature(s) of the hot melt adhesive.

The panel may be partially or fully assembled before it is conformed to the initial shape and the adhesive set whilst the panel is subject to the temperature gradient. Two or more of the members may be connected together prior to assembly of the stack. This connection may be made by using set or uncured adhesive. Thus two or more members, up to and including all members, may be connected or bonded together in an initial state and then placed on the mould and bent to the initial shape. The initial state does not need to be flat. Adhesives other than hot melt adhesive that when uncured have sufficient "tackiness" may be used to connect the members together. External clips or similar may also be used to connect members together.

When hot melt adhesive is used to connect the members it may be necessary to heat the members to melt the adhesive before conforming to the initial shape.

In the preferred technique the temperature of the underneath of the mould layer is measured at the centre of the mould, as this location will be the slowest to heat up. This is measured using a thermocouple 70 attached to the underside of the mould layer 64. Other means of measuring the temperature of the underneath of the layer may be used. Temperatures at one or more other parts of the mould may be taken, but it has been found that a single location for temperature measurement provides acceptable results.

A thermocouple 72 is positioned centrally on the top of the vacuum bag. This is used later in the process.

Once the temperatures measured by either or both of the thermocouples 70, 72 are above thresholds corresponding to melting of all three layers of hot melt adhesive the assembly is removed from the oven and allowed to cool in a controlled environment whilst the vacuum remains applied.

In the present embodiment the mould is formed of metal strips and a metal mould plate. These have high mass and high specific heat capacity compared to the components for the panel and the vacuum bag. As such, the mould will cool slower than the top of the panel 10. This results in differential cooling between the upper and lower members of the panel and the members will reach their setting temperature(s) at different times.

By modifying the rate of cooling of the front of the mould relative to the back of the mould, a controlled temperature gradient through the panel can be maintained as the panel cools. This results in the three hot melt adhesive layers reaching their setting temperature(s) at different times when the same hot melt adhesive is used for all adhesive layers.

In the preferred embodiments the temperatures of at least one location on the top of the panel and at least one location on the bottom of the mould are measured. The thermocouples 70 and 72 may be used.

In the preferred embodiment the mould is placed in a location at ambient temperature and ambient temperature air is blown onto the underside of the mould. The air may be blown by one or more fans.

A cooling program measures the temperatures and controls the fans so as to vary the cooling of the mould from below. Optionally, the cooling program also receives an input that identifies the mould and varies the amount of cooling according to the specific mould. The mould may have a bar code 74 that is read by a suitable scanner. Alternatively, the moulds may each have a tag, marker, protrusion or other component that interacts with a detector, such as one or more switches, that selects one of a multiple of cooling regimes.

The invention is not limited to cooling from below and includes cooling both top and bottom, or with cooling integrated into the mould. If required, heating may be applied to part of the mould (such as its top). What is important is to maintain a controlled temperature gradient.

With the current mould even with cooling from below there is a temperature gradient through the panel with the upper member cooler than the lower members. Accordingly, the uppermost hot melt adhesive layer 24 cools to its setting temperature before the two lower hot melt adhesive layers 20, 22. When the upper layer 24 of hot melt adhesive reaches its setting temperature it locks the upper steel member 18 to the wood composite member 16.

The cooling continues. Stresses build up between the wood composite member 16 and the upper metal member 18 as they cool because the coefficients of expansion of the wood composite and steel are different. The other hot melt adhesive layers are still above their setting temperatures so no stresses build up between other members as they cool.

When the middle layer 22 of hot melt adhesive reaches its setting temperature the lower steel member 14 is locked to the wood composite member 16 but the glass member is not.

Stresses build up between the wood composite member 16 and the two steel members 14, 18 as cooling continues but the stresses in the glass member 12 remains unchanged as the glass cools.

Finally the lower layer 20 of hot melt adhesive cools to its setting temperature and the glass member 12 is locked to the lower metal member 14.

At this point, whilst the vacuum is still applied and maintaining the members conformed to the mould, the two metal members 14, 18 and the spacer member 16 have inbuilt stresses due to the different amounts of thermal contraction. The glass has no thermally induced stresses at this point.

When all three hot melt adhesive layers are below the setting point the vacuum may be removed. After removal of the vacuum the stresses built up in the members result in the panel curving to a shape that is not necessarily the same as the shape of the mould surface 66.

The panel 10 is then allowed to cool to ambient temperature. The edges of the panel are sealed with a suitable sealant 26 to prevent damage from water, air or other materials.

The shape of the panel depends on the relative stresses induced in the members 14, 16, 18 before the last hot melt adhesive layer sets. This in turn depends on the temperature gradient through members bonded together when each hot melt adhesive layer sets. The following three examples demonstrate how different mirror panel shapes can be created off an identical mould by changing the differential cooling regime.

As a first example the panel is cooled equally (and relatively slowly), there is no differential cooling regime and so no temperature gradient affect. All three members reach their setting temperature at substantially the same time. The layers will lock together at the same time and, at that temperature, there will be no induces stresses. Removal of the vacuum will not result in any bending of the panel. At that setting temperature it will have the shape of the mould. Of course cooling to ambient will induce stresses that will result in shape change due to the different coefficients of expansion.

Figure 6:
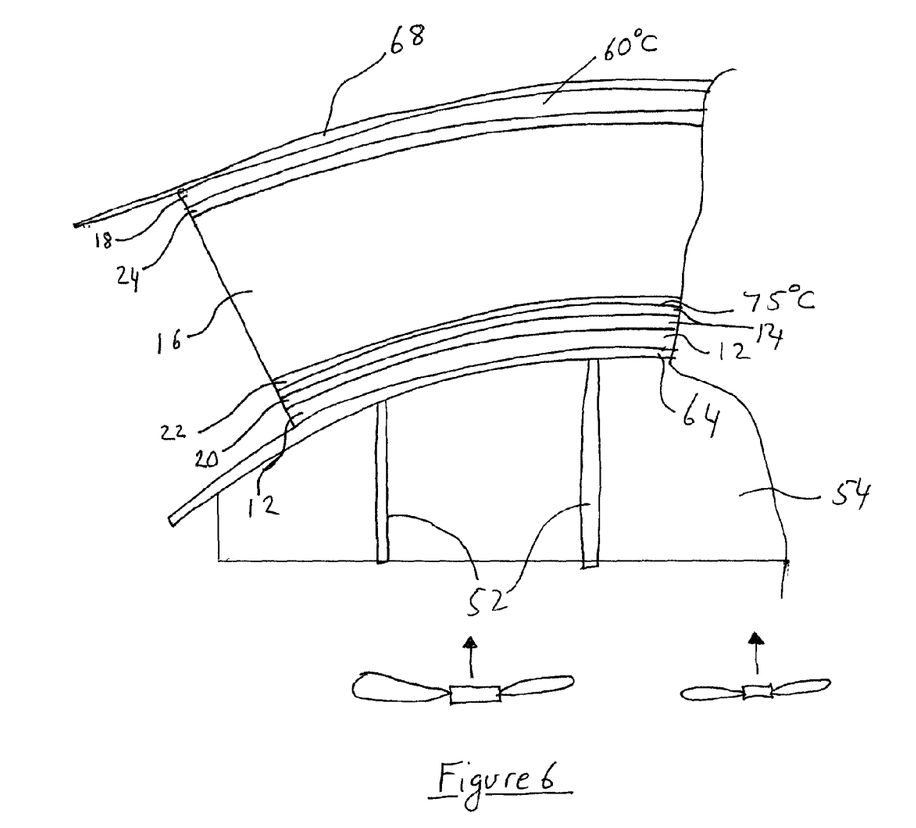
FIG. 6 is a detail view of part of FIG. 5.

As a second example, if the panel is cooled from one side (and relatively rapidly) the temperature of the adhesive layer nearest that cooled side will be below its setting point when the middle adhesive layer sets. Assume the hot melt adhesive has a setting temperature of 75° C. Referring to FIG. 6, assume a small amount of cooling has been applied to the mould 50. Because of the mass of the mould 50, the panel has cooled from the top down and the top layer 24 of hot melt adhesive has already cooled below its setting temperature of 75° C. By the time the middle adhesive layer cools to 75° C. the top member 18 of steel may have cooled to 60° C.

In contrast, as a third example with the same mould, if more cooling has been applied to the mould 50 the lower parts of the panel will have cooled faster than before (but still slower than the top). As such, the top member of steel 18 will not have cooled as much by the time the middle layer of adhesive 22 cools to 75° C. and may be at 65° C. as opposed to 60° C. As such the induced stresses will be less. When the two panels are removed from the mould and cooled to the same temperature the induced stresses will result in different shapes to each other and the first example where there was no differential cooling.

We can use this differential cooling in various ways, either alone or in combination. We can vary the cooling regime to accommodate for variations in ambient conditions, such as ambient temperature, to ensure that a consistent temperature gradient is applied to panels produced from the same mould so that they have a consistent shape. We can correct variations in mould shape so that the final shape of panels is adjusted to compensate for variations in mould shape (mainly due to variations in manufacturing the moulds). Thus if we wish to produce panels having substantially the same shape from different moulds we can vary the cooling regime for each mould to produce different thermally induced stresses in the panels to compensate for variations in mould surface shape.

We can also create different shaped panels from the same mould. These may be combined so that a set of moulds may be used to create panels that have different shapes and, more particularly, sets of panels, each panel of a set having substantially the same shape as the other panels of the set and substantially different to the shape of panels of other sets.

The above description assumes that all of the hot melt adhesive of a layer reaches its setting temperature at substantially the same time. Differential cooling may be used to vary the shape of a panel by also varying the time when parts of the same layer of hot melt adhesive reach their setting temperature or to ensure that all of a layer of hot melt adhesive sets at the same time.

Figure 7:
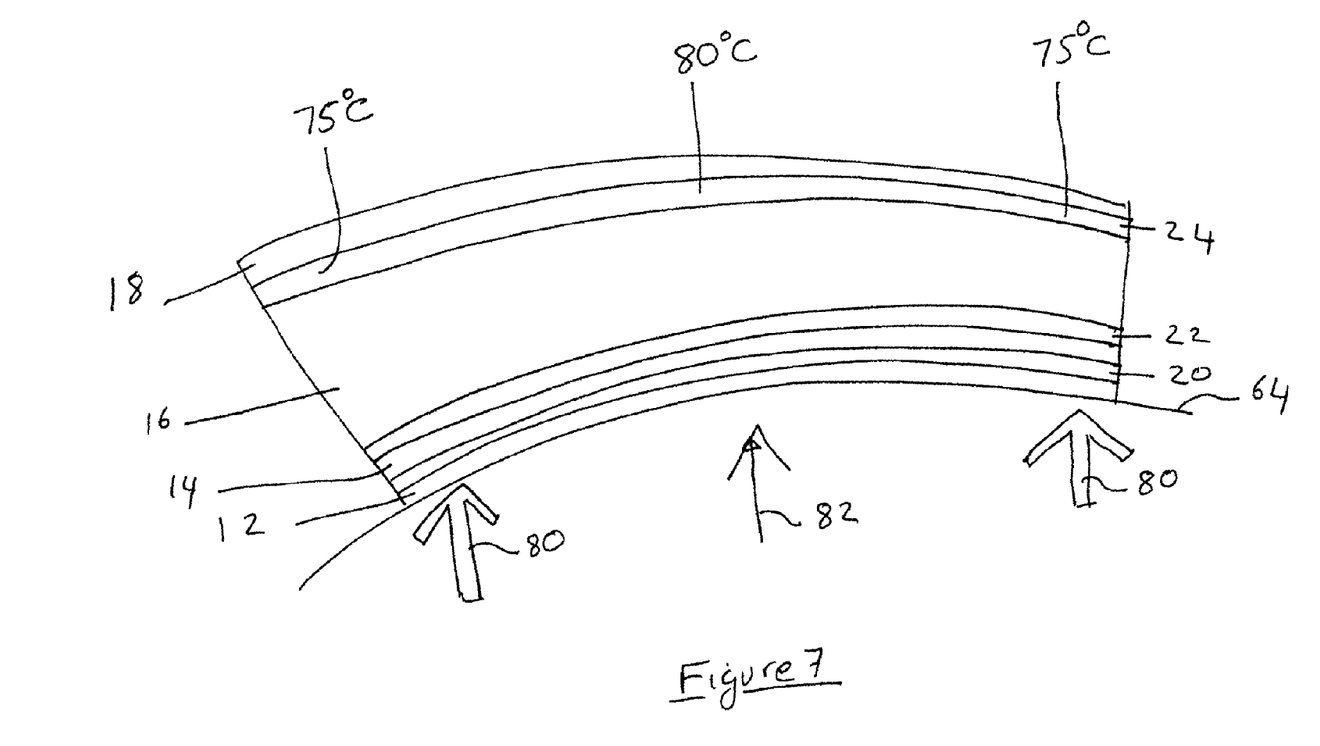
FIG. 7 is a schematic detail view of part of FIG. 5 showing a different cooling regime.

Referring to FIG. 7, a panel has more cooling applied at its edge regions, indicated by large arrows 80, than at its centre, indicated by small arrow 82. Accordingly, the outer regions of a member reach the setting temperature before the centre region. This causes induced stresses in the outer portions when the centre portion reaches its setting temperature. This may be achieved by providing different fans for different regions and modifying the fan speed of the fans to vary the rate of cooling.

Whilst the embodiments of the invention utilise cooling of the mould and the lower members of the panels, it will be appreciated that cooling may be applied to the top surface or both the top and bottom surface. Further, hot air may be applied to either or both surfaces to slow the rate of cooling.

Using these manufacturing techniques a panel may be manufactured with a slope error of less than or equal to about 5 milliradian, more preferably less than or equal to 2 milliradian and most preferably less than or equal to 1 milliradian.

Standard MDF uses urea formaldehyde resin and we have found that at temperatures of 110-120° C. the MDF will curve and retain its new shape when cooled to ambient. It is believed this is due to softening of the urea formaldehyde resin. Time is also important—the same effect can be achieved at lower temperatures (>90° C.) if the board is held at that temperature for some time (say 20 minutes). We believe that this reduces stresses in the finished product compared to a spacer that does not undergo softening.

Whilst resin bonded wood composite is the preferred spacer material, panels may be manufactured using the above method that use other materials for the spacer member, such as but not limited to paper or aluminium honeycomb; expanded (foamed) polymers or plastics, such as expanded Polystyrene, PVC, Polyurethane, Polypropylene, Polymethyl methacrylamide (acrylic) and Styrene acrylonitrile (SAN); Balsa wood; Bamboo or cardboard.

Fibre reinforced resin, polymer or plastics sheets or fabrics such as glass or carbon fibre may be used as stiffening members. If desired the stack of members may be assembled with the fibre reinforced resin uncured, with the resin acting as the adhesive and the resin being cured during the manufacturing process.

Whilst hot melt adhesives are preferred, other adhesive(s) may be used. Assuming an adhesive that sets over time, whether independently of temperature or not, by creating a temperature gradient in the layers the members will be at different temperatures when the adhesive layers set. Accordingly, the amount by which the temperature of each layer changes from the temperature at which it was bonded to an adjacent layer to ambient can be controlled by controlling the temperature gradient.

Once the panels have been manufactured they may be mounted directly on a solar dish structure, such as disclosed in PCT Patent application number PCT/AU2009/000725 that provides generally parallel beams upon which solar mirror panels may be mounted. The panels are strong and tough enough that they may be bonded directly to the structure and when bonded have the strength to carry a person walking on the surface. Whilst the panels are strong they still have sufficient flexibility to be distorted to conform to the shape of the beams. If the shape of panel does not match that of the beams, the panel will bend to match the shape of the beams and so will approximate the ideal surface at that location nearer than otherwise.

This enables a mirrored surface to be constructed on a parabolic dish using panels that are all substantially identical in shape and curvature or with a small number of sets of substantially identical panels whilst still maintaining excellent overall optical accuracy.

It is thus possible to produce panels for a parabolic mirror that are substantially identical. This leads to significant cost savings in both manufacture and assembly and avoids the risk of placing a panel in the wrong location. Further, if the panels are manufactured to have a substantially spherical reflective surface, rather than a parabolic surface, they may be placed on the beams in any orientation Whilst the method has been described with reference to manufacture of a panel having two stiffening members sandwiching a spacer member, it is not limited to making a panel so constructed and may be used for manufacture of panels having other constructions. Accordingly, the method may be applied to manufacture of panels having less than or more than two stiffening members and more than one spacer member.

Whilst the preferred embodiment utilises continuous sheet like stiffening and spacer members, these need not be continuous and may have perforations to reduce weight and/or tune bending.

Unless the context clearly requires otherwise, throughout the description and any claims the words 'comprise', 'comprising', and the like are to be construed in an inclusive sense as opposed to an exclusive or exhaustive sense; that is to say, in the sense of "including, but not limited to".

It will be apparent to those skilled in the art that many obvious modifications and variations may be made to the embodiments described herein without departing from the spirit or scope of the invention.

The invention claimed is:

1. A method of manufacturing a solar mirror sandwich panel, the method comprising:
   providing, stacked one on top of another, a stack of at least:
      a sheet-like reflective member having a reflective surface;
      a first sheet-like stiffening member,
      a spacer member located between the reflective and stiffening members,
   with layers of adhesive material between adjacent members;
   conforming the at least three members to an initial shape, and
   whilst maintaining the at least three members conformed to the initial shape:
      (a) cooling, heating or both heating and cooling the members so as to create one or more controlled temperature gradients:
         between the members,
         within one or more members, or
         between the members and within one or more members,
      and, whilst the one or more controlled temperature gradients exist,
         (b) bonding adjacent members together with the adhesive therebetween,
      wherein the temperature of the members is varied whilst maintaining the one or more controlled temperature gradients.

2. A method of claim 1 including selecting a desired shape and creating the one or more controlled temperature gradients according to the desired shape.

3. The method of claim 1 wherein each member is at a different temperature when adhesive sets to the respective member.

4. The method of claim 1 wherein the one or more controlled temperature gradients vary with time.

5. The method of claim 1 wherein a first layer sets before another layer nearer the centre of the stack than the first.

6. The method of claim 1 wherein the layers of adhesive are set sequentially from one side of the stack.

7. The method of claim 1 including a second sheet-like stiffening member between the spacer member and the reflective member.

8. The method of claim 1 wherein at least one adhesive layer is an adhesive that sets dependent on temperature, dependent on time or dependent on both temperature and time.

9. The method of claim 1 wherein a single adhesive is used between a pair of adjacent members.

10. The method of claim 1 wherein all of the adhesive layers are of the same adhesive.

11. The method of claim 1 wherein two or more adhesives are used.

12. The method of claim 1 wherein at least one adhesive layer includes a hot melt adhesive.

13. The method of claim 1 wherein the stack is assembled with at least one layer of adhesive attached to at least one member before the stack is conformed to said initial shape.

14. The method of claim 1 wherein the stack is assembled with at least two members connected together in an initial state before the stack is conformed to said initial shape.

15. The method of claim 1 wherein the stack is assembled with at least two members bonded together in an initial state by at least one respective adhesive layer before the stack is conformed to said initial shape.

16. The method of claim 15 wherein the initial state is generally planar.

17. The method of claim 1 wherein the stack is assembled with all members bonded together in an initial state by said adhesive layers before the stack is conformed to said initial shape.

18. The method of claim 1 wherein bonding of adjacent members is achieved by first heating the members and adhesive to above the respective melting temperature of the adhesive and then cooling the respective adhesive layer to below the setting temperature of the adhesive.

19. The method of claim 1 wherein the panel has four members and three layers of hot melt adhesive.

20. The method of claim 1 wherein the step of conforming the members includes conforming against a mould surface.

21. The method of claim 20 including identifying the mould and modifying the one or more temperature gradients according to the mould identified.

22. A method of producing at least two solar mirror panels using the method of claim 1 wherein stacks of at least two panels are conformed to at least two different shapes and said one or more temperature gradient is modified such that each at least two solar mirror panels have substantially the same shape at the same temperature.

23. A method of producing at least two solar mirror panels using the method of claim 1 wherein stacks of at least two panels are conformed to at least one shape and said one or more temperature gradient is modified such that each at least two solar mirror panels have different, predetermined shapes at the same temperature.

24. The method of claim 1 wherein at least said first stiffening member is comprised of metal, woven fabric, unwoven fabric or fibre reinforced resin.

25. The method of claim 1 wherein at least said first stiffening member comprises a steel sheet having a thickness between about 0.3 and about 1.0 mm.

26. A method of manufacturing a solar mirror sandwich panel, the method comprising:
   providing, stacked one on top of another, a stack of at least:
      a sheet-like reflective member having a reflective surface;
      a first sheet-like stiffening member,
      a spacer member located between the reflective and stiffening members,
   with layers of adhesive material between adjacent members;
   conforming the at least three members to an initial shape, and
   whilst maintaining the at least three members conformed to the initial shape:
      (a) cooling, heating or both heating and cooling the members so as to create one or more controlled temperature gradients:
         between the members,
         within one or more members, or
         between the members and within one or more members,
      and, whilst the one or more controlled temperature gradients exist,
      (b) bonding adjacent members together with the adhesive therebetween,
   wherein each member is at a different temperature when adhesive sets to the respective member.

27. A method of claim 26 including selecting a desired shape and creating the one or more controlled temperature gradients according to the desired shape.

28. A method of claim 26 wherein the temperature of the members is varied whilst maintaining the one or more controlled temperature gradients.

29. The method of claim 26 wherein the one or more controlled temperature gradients vary with time.

30. The method of claim 26 wherein the layers of adhesive are set sequentially from one side of the stack.

31. The method of claim 26 wherein a first layer sets before another layer nearer the centre of the stack than the first.

32. The method of claim 26 including a second sheet-like stiffening member between the spacer member and the reflective member.

33. The method of claim 32 wherein at least said first stiffening member is comprised of metal, woven fabric, unwoven fabric or fibre reinforced resin.

34. The method of claim 32 wherein at least said first stiffening member comprises a steel sheet having a thickness between about 0.3 and about 1.0 mm.

35. The method of claim 26 wherein at least one adhesive layer is an adhesive that sets dependent on temperature, dependent on time or dependent on both temperature and time.

36. The method of claim 26 wherein a single adhesive is used between a pair of adjacent members.

37. The method of claim 26 wherein all of the adhesive layers are of the same adhesive.

38. The method of claim 26 wherein two or more adhesives are used.

39. The method of claim 26 wherein at least one adhesive layer includes a hot melt adhesive.

40. The method of claim 26 wherein the stack is assembled with at least one layer of adhesive attached to at least one member before the stack is conformed to said initial shape.

41. The method of claim 26 wherein the stack is assembled with at least two members connected together in an initial state before the stack is conformed to said initial shape.

42. The method of claim 26 wherein the stack is assembled with at least two members bonded together in an initial state by at least one respective adhesive layer before the stack is conformed to said initial shape.

43. The method of claim 26 wherein the stack is assembled with all members bonded together in an initial state by said adhesive layers before the stack is conformed to said initial shape.

44. The method of claim 42 wherein the initial state is generally planar.

45. The method of claim 26 wherein bonding of adjacent members is achieved by first heating the members and adhesive to above the respective melting temperature of the adhesive and then cooling the respective adhesive layer to below the setting temperature of the adhesive.

46. The method of claim 26 wherein the panel has four members and three layers of hot melt adhesive.

47. The method of claim 26 wherein the step of conforming the members includes conforming against a mould surface.

48. The method of claim 47 including identifying the mould and modifying the one or more temperature gradients according to the mould identified.

49. A method of producing at least two solar mirror panels using the method of claim 26 wherein stacks of at least two panels are conformed to at least two different shapes and said one or more temperature gradient is modified such that each at least two solar mirror panels have substantially the same shape at the same temperature.

50. A method of producing at least two solar mirror panels using the method of claim 26 wherein stacks of at least two panels are conformed to at least one shape and said one or more temperature gradient is modified such that each at least two solar mirror panels have different, predetermined shapes at the same temperature.

* * * * *